(12) United States Patent
Vajravel et al.

(10) Patent No.: US 12,379,970 B2
(45) Date of Patent: Aug. 5, 2025

(54) MANAGING BEST KNOWN CONFIGURATIONS FOR WORKSPACES

(71) Applicant: Dell Products L.P., Round Rock, TX (US)

(72) Inventors: Gokul Thiruchengode Vajravel, Bangalore (IN); Vivekanandh Narayanasamy Rajagopalan, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 739 days.

(21) Appl. No.: 17/685,182

(22) Filed: Mar. 2, 2022

(65) Prior Publication Data

US 2023/0281058 A1   Sep. 7, 2023

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01); *G06F 2009/45591* (2013.01)

(58) Field of Classification Search
CPC ............... G06F 9/5077; G06F 9/45558; G06F 2009/4557; G06F 2009/45591; G06F 8/60; G06F 9/50; G06F 9/5005; G06F 9/5011; G06F 9/5016; G06F 9/5027
See application file for complete search history.

(56) References Cited

U.S. PATENT DOCUMENTS

| | | | |
|---|---|---|---|
| 11,080,041 B1* | 8/2021 | Ah Kun | G06F 9/44505 |
| 2007/0234302 A1* | 10/2007 | Suzuki | G06F 9/45558 717/136 |
| 2010/0042994 A1* | 2/2010 | Vasilevsky | G06F 9/45533 718/1 |
| 2015/0213106 A1* | 7/2015 | Kunde | G06F 9/45558 718/1 |
| 2020/0081731 A1* | 3/2020 | Zhong | G06F 9/5077 |
| 2022/0012030 A1* | 1/2022 | Wang | G06F 8/60 |

* cited by examiner

*Primary Examiner* — Andy Ho
(74) *Attorney, Agent, or Firm* — Kirton McConkie; Brian Tucker

(57) ABSTRACT

Best known configurations for workspaces can be managed. Device groups can be defined based on functional roles or organizational departments. Each device group can be associated with a workspace along with a best known configuration for the workspace that is based on the device group. Workspaces can then be deployed to the end-user computing devices based on the device group to which each end-user computing device belongs and in accordance with the associated best known configuration.

20 Claims, 7 Drawing Sheets

Workspace Metadata Table 301

| Device Group ID | Device Characteristics | Workspace Target Type | Workspace Resource Allocation | Workspace ID |
|---|---|---|---|---|
| DGID_1 (R&D Team 1) | 32GB RAM, 16 Core (VT-x enabled), 1 TB HDD | HW Container (Lightweight Windows VM) | Size = 40GB, 30% of CPU cores, 8 GB RAM, Max # per device = 3 | Workspace_ID_1 |
| DGID_2 (Sales) | 16GB RAM, 8 Core, 256GB HDD | SW Container (Sandboxie) | Size = 10GB, CPU & RAM shared with OS process, Max # per device = 10 | Workspace_ID_2 |
| DGID_3 (R&D Team 2) | 32GB RAM, 8 Core, 1TB HDD | SW Container (Docker) | Size = 20GB, CPU & RAM shared with OS process, Max # per device = 6 | Workspace_ID_3 |
| ... | | | | |

*FIG. 3A*

Workspace Best Known Configuration Table 302

| Workspace ID | Apps | Workspace host version and configuration | Best Known Configuration |
|---|---|---|---|
| Workspace_ID_1 | • Visual Studio<br>• Visio<br>• Teams<br>• SCCM | • Hypervisor: Windows Hyper-V<br>• Workspace Type: Windows Sandbox with persistence stack<br>• Workspace OS: Windows 10 | • Peripheral assignment via RemoteFx USB redirection<br>• Webcam config: 2K/30fps, no background blur<br>• Webcam driver: Inbox |
| Workspace_ID_2 | • Salesforce<br>• Office 365 +<br>• Teams | • Hypervisor: None<br>• Workspace Type: Sandboxie v2<br>• Workspace OS: None | • Peripheral assignment: add webcam, audio in allowed list of peripherals<br>• Webcam config: 1K/30fps, no background blur<br>• Webcam driver: N/A<br>• Sandboxie.INI with config |
| Workspace_ID_3 | • VS-Code<br>• Visio<br>• Zoom | • Hypervisor: None<br>• Workspace Type: Sandboxie v2<br>• Workspace OS: None | • Peripheral assignment: add webcam, audio in allowed list of peripherals<br>• Webcam config: 1K/30fps, no background blur<br>• Webcam driver: N/A<br>• Sandboxie.INI with config |
| ... | | | |

FIG. 3B

Workspace Bundle Table 303

| Workspace ID | Device Characteristics | Workspace Friendly Name | Workspace Metadata | Project | Apps |
|---|---|---|---|---|---|
| Workspace_ID_1 | 32GB RAM, 16 Core (VT-x enabled), 1TB HDD | Productivity Workspace | Win Sandbox + BKC | Development | • Visual Studio<br>• Visio<br>• Teams<br>• SCCM |
| Workspace_ID_2 | 16GB RAM, 8 Core, 256GB HDD | Sales Workspace | Sandboxie + BKC | Sales and Marketing | • Salesforce<br>• Office 365<br>• Teams |
| Workspace_ID_3 | 32GB RAM 8 Core, 1TB HDD | Productivity Workspace | Sandboxie + BKC | Development | • VS-Code<br>• Visio<br>• Zoom |
| ... | | | | | |

FIG. 3C

MANAGING BEST KNOWN CONFIGURATIONS FOR WORKSPACES

CROSS-REFERENCE TO RELATED APPLICATIONS

N/A

BACKGROUND

In the context of this application, a workspace refers to an isolated environment in which one or more applications may be hosted. A workspace is typically implemented using container technologies and therefore the terms "workspace" and "container" are oftentimes interchanged. Different workspace/container infrastructures may be used to create a workspace. FIG. 1 represents a computing device 100 that has physical hardware 101, a hypervisor 102 and a host operating system 120. Application 121 is an example of an application that is not deployed in a workspace in that it relies on binaries/libraries 120 to interface directly with host operating system 110.

Application 122 is an example of an application that is hosted in a software-based workspace. As represented in FIG. 1, application 122 and its binaries/libraries 131 may be isolated within its own workspace 132 that is executed via a workspace engine 130 that runs on host operating system 110. A Docker container and Snap are common examples of software-based workspace.

Application 123 is an example of an application that is hosted in a hardware-based workspace. As represented in FIG. 1, with a hardware-based workspace, a uni/mini kernel 140 may be executed on hypervisor 102. A workspace engine 141 can then be run on uni/mini kernel 140 to isolate application 123 and its binaries/libraries 142 in its own workspace 143. A Kata container is a common example of a hardware-based workspace. Hyper-V docker, Photon-OS, and Include OS are also common platforms for creating hardware-based workspaces.

Although workspaces facilitate the process of deploying applications to end-user computing devices, it is still a tedious and largely manual process to deploy a set of applications to a particular end-user computing device. For example, an organization may have a variety of user/employee groups where each group uses certain end-user computing devices and/or certain sets of applications. Although workspaces may be defined and deployed to these end-user computing devices, the workspaces, including a specific grouping of workspaces, will not be customized to the particular capabilities of the end-user computing devices, at least without substantial manual intervention.

BRIEF SUMMARY

The present invention extends to systems, methods and computer program products for managing best known configurations for workspaces. Device groups can be defined based on functional roles or organizational departments. Each device group can be associated with a workspace along with a best known configuration for the workspace that is based on the device group. Workspaces can then be deployed to the end-user computing devices based on the device group to which each end-user computing device belongs and in accordance with the associated best known configuration.

In some embodiments, the present invention may be implemented as a method for managing best known configurations for workspaces. A first device group consisting of end-user computing devices can be identified. A best known configuration for a first workspace to be deployed to the end-user computing devices in the first device group can be defined. The best known configuration for the first workspace can be associated with the first device group. The first workspace can then be deployed to the end-user computing devices in the first device group including by applying the best known configuration to the first workspace.

In some embodiments, the present invention may be implemented as computer storage media storing computer executable instructions which when executed implement a method for managing best known configurations for workspaces. A first device group consisting of a first set of end-user computing devices can be created. A second device group consisting of a second set of end-user computing devices can also be created. A best known configuration for a first workspace to be deployed to the first set of end-user computing devices in the first device group can be defined. A best known configuration for a second workspace to be deployed to the second set of end-user computing devices in the second device group can also be defined. A type of the first workspace may match a type of the second workspace but the best known configuration of the first workspace may not match the best known configuration for the second workspace. The best known configuration for the first workspace can be associated with the first device group. The best known configuration for the second workspace can be associated with the second device group. The first workspace can be deployed to the first set of end-user computing devices in the first device group including by applying the best known configuration for the first workspace. The second workspace can be deployed to the second set of end-user computing devices in the second device group including by applying the best known configuration for the second workspace.

In some embodiments, the present invention can be implemented as a method for deploying a workspace to end-user computing devices in a device group. A device group ID can be received. The device group ID can be used to identify workspace metadata and a best known configuration that is associated with the device group ID. The workspace metadata can identify a type of a workspace to be deployed and resource allocation for the workspace. The best known configuration can define customizations to the workspace that are specific to a device group defined by the device group ID. The workspace can be launched in accordance with the workspace metadata. The workspace can also be customized in accordance with the best known configuration.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3C provide examples of data structures that may be used when embodiments of the present invention are implemented;

DETAILED DESCRIPTION

Figure 1:
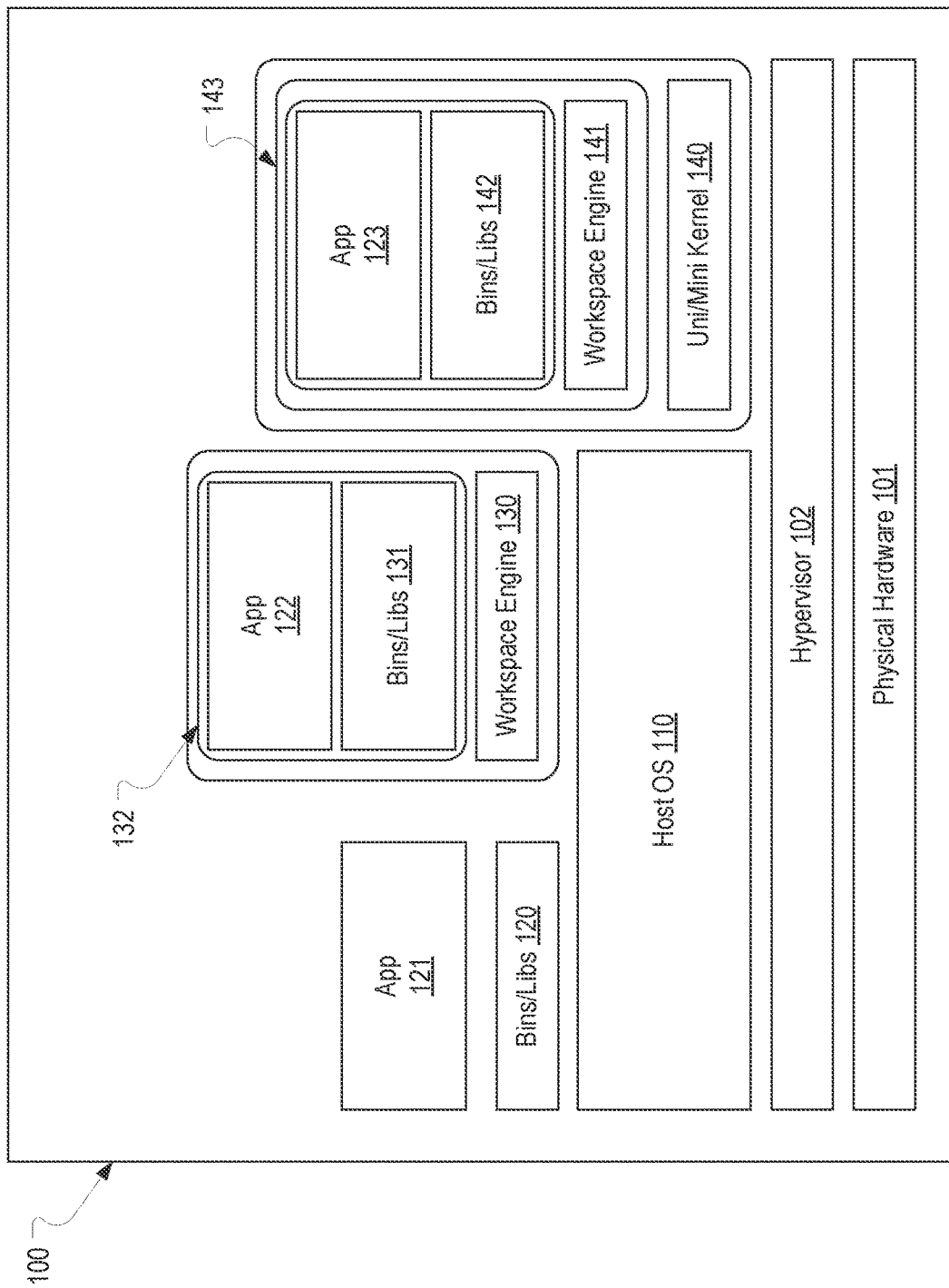
FIG. 1 provides an example of a computing device that includes workspaces.
Figure 2:
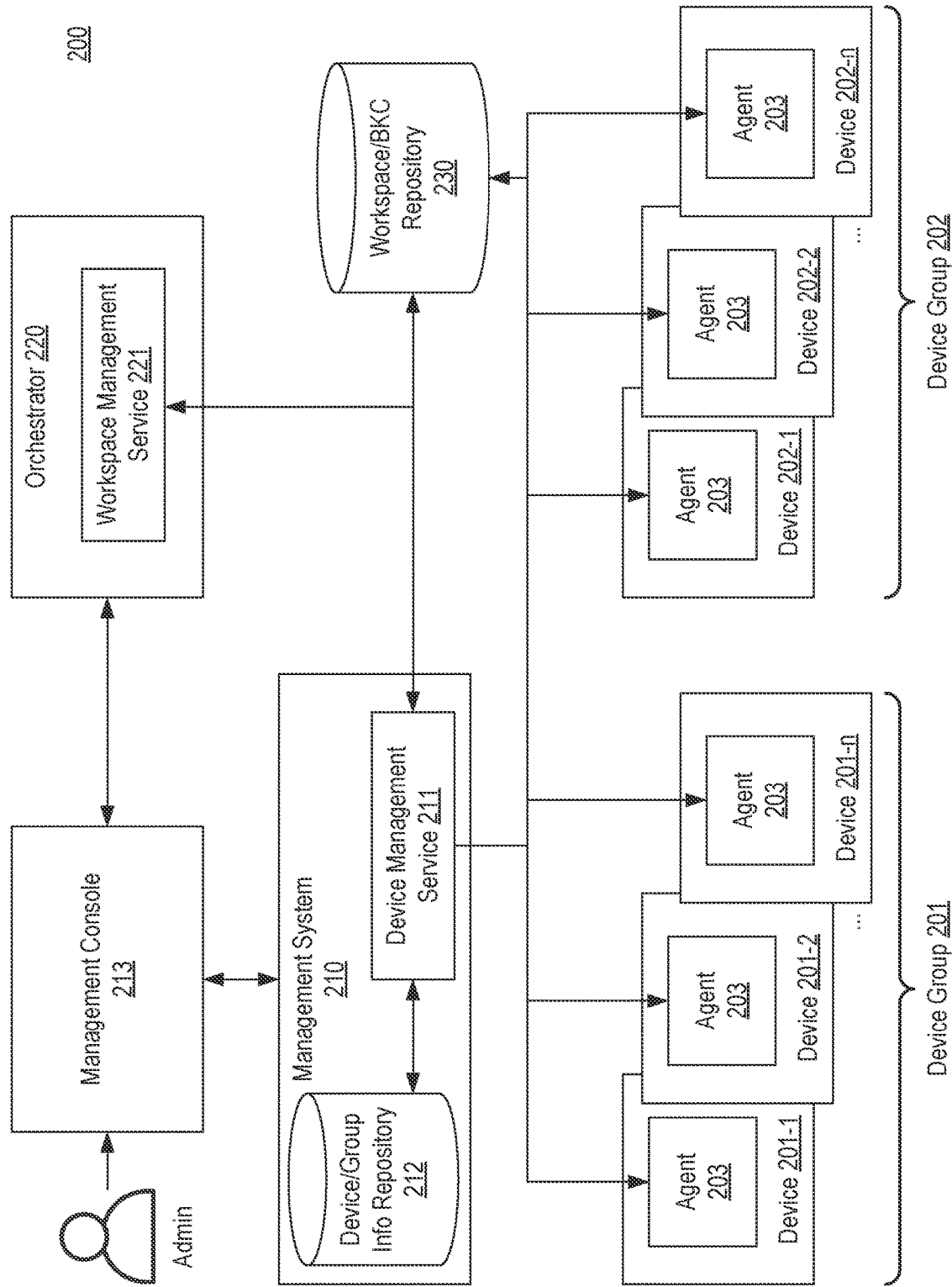
FIG. 2 provides an example of a computing environment in which one or more embodiments of the present invention may be implemented.

FIG. 2 provides an example of a computing environment 200 in which one or more embodiments of the present invention may be implemented. Computing environment 200 includes end-user computing devices (or simply devices) 201-1 through 201-*n* and devices 202-1 through 202-*n* which are assumed to form device groups 201 and 202 respectively. In some embodiments, there could be many device groups, each including any reasonable number of devices. As a common example, these devices could be laptops used by employees of a company to perform their work.

Computing environment 200 also includes a management system 210 that is used to manage devices 201-1 through 201-*n* and devices 202-1 through 202-*n* via an agent 203 deployed on each of these devices. Management system 210 could be Microsoft Endpoint Configuration Manager, Wyse Management Suite, TechDirect, or any other solution for managing devices. In accordance with embodiments of the present invention, management system 210 can include a device management service 211 to facilitate the management of best known configurations for workspaces. Management system 210 may maintain a device/group information repository 212 for defining information about devices 201-1 through 201-*n* and devices 202-1 through 202-*n* and devices groups 201 and 202. Device management service 211 may leverage device/group information repository 212 as part of managing best known configurations for workspaces. A management console 213 may allow an administrator to interface with management system 210.

Computing environment 200 further includes an orchestrator 220 that is generally configured to orchestrate the deployment of workspaces on devices 201-1 through 201-*n* and devices 202-1 through 202-*n*. In accordance with embodiments of the present invention, orchestrator 220 can include a workspace management service 221 that facilitates the management and deployment of best known configurations for workspaces. Workspace management service 221, as well as device management service 211, may leverage a workspace/best known configuration (BKC) repository 230 for this purpose.

As an overview, embodiments of the present invention can be implemented to enable the administrator to design workspaces and their best known configurations to suit organization or other requirements and based on multiple factors including primarily the device group while also accounting for device capabilities, applications, and other factors. Stated another way, embodiments of the present invention enable an administrator to easily create and deploy workspaces having a best known configuration for a particular device group.

FIGS. 3A-3C provide examples of various data structures that may be employed in one or more embodiments of the present invention to facilitate the management of best known configurations for workspaces. These data structures can be maintained in workspace/BKC repository 230 and used by workspace management service 221 and device management service 211 as described in detail below. Although each data structure is represented as a table, the information contained in the data structures could be maintained in any suitable format.

FIG. 3A includes a workspace metadata table 301 that can be compiled and maintained by workspace management service 221 to define a workspace and associate the workspace with a device group. For example, workspace metadata table 301 includes columns for device group ID and device characteristics which can define a device group (e.g., device group 201 or device group 202). Workspace metadata table 301 also includes columns for workspace target type, workspace resource allocation and workspace ID which define workspace metadata and associate it with the respective device group.

With reference to the first row in workspace metadata table 301, a device group is defined as having the device group ID of DGID_1 and consisting of devices that each have 32 GB of RAM, a 16 core processor with VT-x enabled and a 1 TB HDD. As indicated, this device group could be defined for the devices used by a particular R&D team at an organization. Workspace metadata table 301 can also associate this device group (DGID_1) with workspace metadata for a workspace having a workspace ID of Workspace_ID_1 where the workspace metadata indicates that (1) the type of workspaces to be deployed on the devices in the device group should be hardware containers (e.g., lightweight Windows virtual machines) and (2) that the resources allocated to each workspace deployed on the devices in the device group should include 40 GB of storage, 30% of the CPU cores, and 8 GBs of RAM, with a maximum of 3 workspaces per device.

In comparison, the second row in workspace metadata table 302 defines a device group having the device group ID of DGID_2 which consists of devices that each have 16 GB of RAM, an 8 core processor, and a 256 GB HDD. As indicated, this device group could be defined for the devices used by the sales team at the organization. This second row also associates the device group (DGID_2) with workspace metadata for a workspace having a workspace ID of Workspace ID_2 where the workspace metadata indicates that (1) the type of workspaces to be deployed on the devices in the device group should be software containers (e.g., Sandboxie containers) and (2) that the resources allocated to each workspace deployed on the devices in the device group should include 10 GB of storage with the CPU and RAM for the workspace being shared with the OS process hosting the workspace and with a maximum of 10 workspaces per device.

FIG. 3B includes a workspace best known configuration table 302 that can be compiled and maintained by workspace management service 221 to define a best known configuration for each workspace defined in workspace metadata table 301. As shown, workspace best known configuration table 302 can include a column for the workspace ID of the respective workspace and possibly a column for identifying the applications to be included in the workspace. Additionally, workspace best known configuration table 302 can include a column for the workspace host version and configuration and a column for the best known configuration. The workspace host and configuration column can include an identification of a hypervisor to be used to host the workspace, if any, a workspace type (e.g., matching the workspace target type in workspace metadata table 301, and an operation system for the workspace, if any. The best known configuration column can identify a variety of configurations for the workspace such as which peripherals are to be made available in the workspace and how, configuration settings for the peripherals, which drivers for the peripherals should be used, any files (e.g., .INIs) that should be included in the workspace to enable the use of the peripherals, etc.

For example, the first row in workspace best known configuration table 302 pertains to the workspace having the workspace ID of Workspace_ID_1 in which Visual Studio, Visio, Teams, and SCCM (System Center Configuration Manger or Endpoint Configuration Manager) are to be run. The first row also defines that the workspace should be implemented using the Windows Hyper-V hypervisor as a Windows Sandbox with a persistence stack which runs the Windows 10 operation system. The first row further defines the best known configuration for this workspace which consists of peripherals, including a webcam, being assigned to the workspace/VM via RemoteFX USB redirection, the webcam being configured to operate at 2K/30 fps with no background blur, and the inclusion of the inbox webcam driver. The best known configurations could include similar configurations, settings, etc. for other peripherals, the applications included in the workspace, or other components or features that may be made available in the workspace.

FIG. 3C includes a workspace bundle table 303 that can be compiled and maintained by workspace management service 221. Workspace bundle table 303 is generally a combination of information defined in workspace metadata table 301 and workspace best known configuration table 303 but may also include additional information by which the administrator can easily identify a workspace and its purpose. For example, in addition to identifying the workspace ID of a workspace, device characteristics of devices in a device group to which the workspace is assigned, the workspace metadata and best known configuration, and the applications included in the workspace, workspace bundle table 303 can identify a workspace friendly name and a project. For example, the first and third rows in workspace bundle table 303 identify the respective workspaces as "productivity workspaces" that are part of the "development" project.

Figure 4:
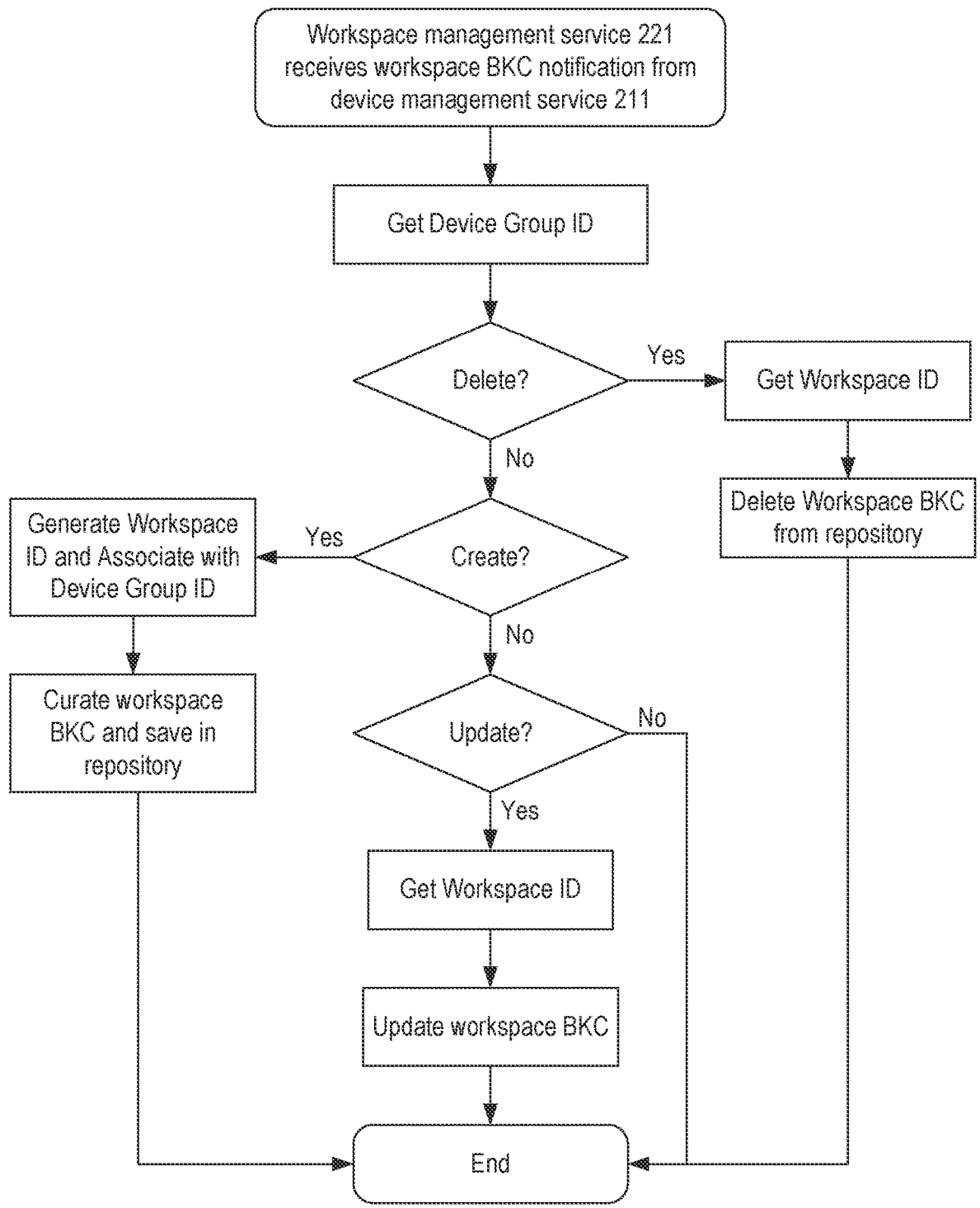
FIG. 4 is a flowchart of functionality that may be performed in one or more embodiments of the present invention to create, update, or delete a best known configuration of a workspace for a device group.

FIG. 4 is a flowchart of a method that workspace management service 221 can perform when it receives a notification to create, update, or delete a best known configuration for a workspace assigned to a device group (a "workspace best known configuration notification"). With reference to FIG. 2, the administrator could use management console 213 to interface with device management service 211 to cause this type of notification to be generated and sent to workspace management service 221. For example, device management service 211 could enable the administrator to define/identify a device group from among the devices that management system 210 manages. Device management service 211 could use device/group information repository 212 to define such device groups. For example, with reference to FIG. 2, device management service 211 could have created one or more entries in device/group information repository 212 which define that devices 201-1 through 201-n are part of device group 201 and that devices 202-1 through 202-n are part of device group 202. Device management service 211 could also allow the administrator to define all the information for the workspace to be associated with the device group including the best known configuration for the workspace relative to the device group.

Returning to FIG. 4, upon receiving a workspace best known configuration notification, workspace management service 221 can identify the device group ID associated with the workspace best known configuration. For example, if the workspace best known configuration notification pertains to the device group for the R&D Team 1 device group, workspace management service 221 can obtain the device group ID of DGID_1 from the workspace best known configuration notification. Then, workspace management service 221 can determine whether the workspace best known configuration notification pertains to a request to delete, create, or update the workspace best known configuration. In the case of a delete, workspace management service 221 could use the device group ID to obtain the associated workspace ID (e.g., by accessing workspace metadata table 301) and use the workspace ID to delete the workspace's best known configuration (e.g., by deleting the entry in workspace best known configuration table 302 having the workspace ID). In the case of a create, workspace management service 221 could create a workspace ID, associate the workspace ID with the device group ID and curate the workspace's best known configuration from information contained in the notification and/or from information retrieved from other sources such as device/group information repository 212. In the case of an update, workspace management service 221 can use the device group ID to retrieve the associated workspace ID and then update the workspace's best known configuration as indicated in the notification (e.g., by updating the entry in workspace best known configuration table 303 having the workspace ID). Accordingly, FIG. 4 represents how the administrator is enabled to manage the best known configurations of workspaces based on the device group to which the workspaces are assigned.

Figure 5:
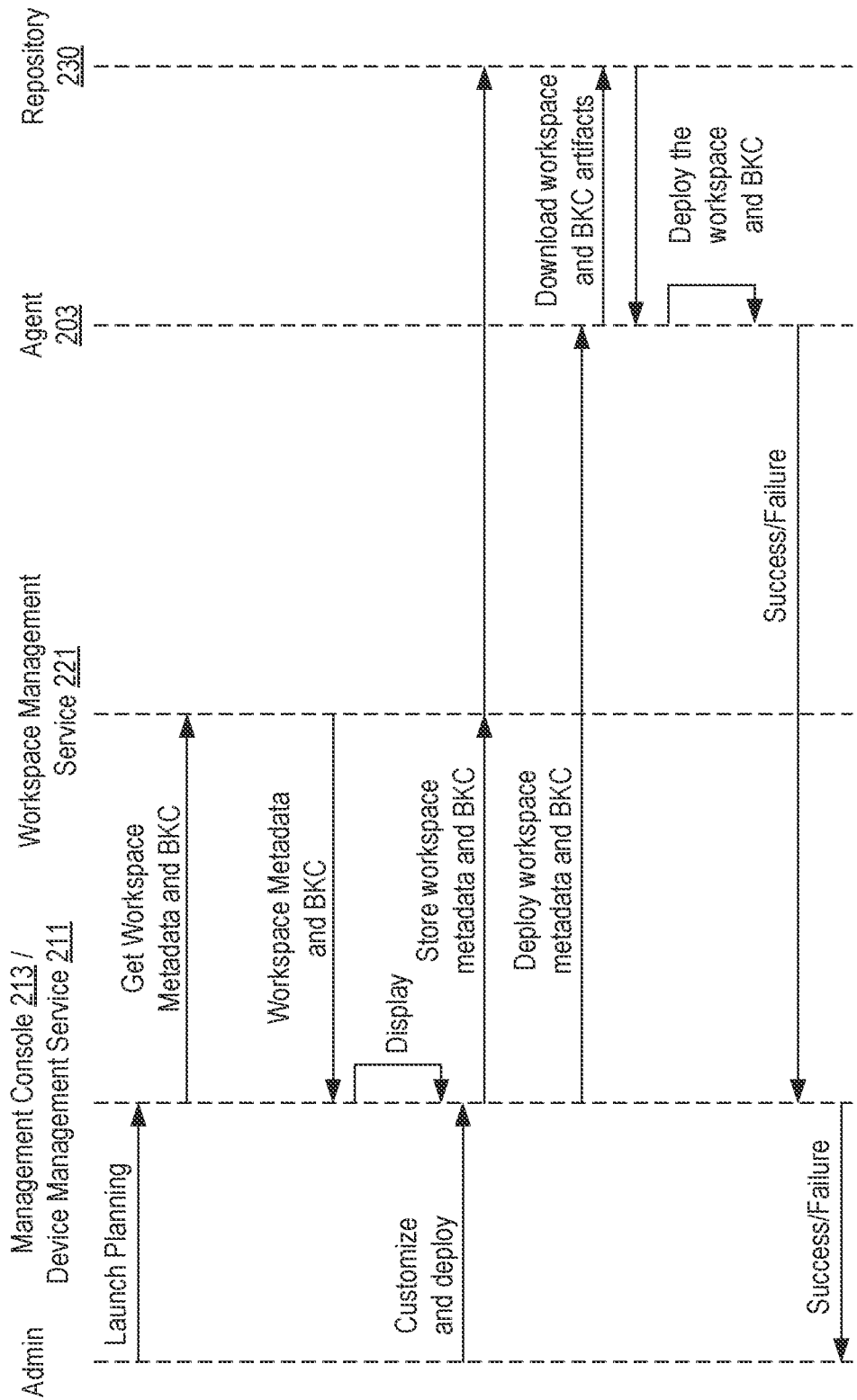
FIG. 5 is a flow diagram representing how a workspace can defined and deployed in accordance with a best known configuration based on a device group.

FIG. 5 is a flowchart that generally encompasses the functionality of FIG. 4 but also extends to the deployment of workspaces with their best known configurations to the devices in the associated device group. As indicated, the administrator can use management console 213 to launch a workspace planning screen. Management console 213 may leverage device management service 211 to provide this workspace planning screen and to respond to the administrator's interactions with the workspace planning screen. For example, as part of providing the workspace planning screen, device management service 211 can interface with workspace management service 221 to retrieve the workspace metadata and the best known configuration for at least one of the workspaces associated with device groups. In some embodiments, the content of workspace metadata table 301, workspace best known configuration table 302, and/or workspace bundle table 303 could be retrieved and presented to the administrator as part of the workspace planning screen to thereby allow the administrator to review all workspaces applicable to device groups that he or she manages.

Management console 213 can display the retrieved workspace metadata and best known configuration to the administrator to allow the administrator to customize it if desired. This step could also encompass allowing the administrator to define new workspace metadata and a best known configuration for a workspace to be associated with a device group. After customizing (or creating) the workspace metadata and best known configuration for a workspace, the administrator can cause the workspace metadata and best known configuration to be stored and deployed to the devices in the associated device group. For example, device management service 211 could relay the workspace metadata and best known configuration to workspace management service 221 which in turn could create, update, or delete the appropriate entries in workspace metadata table 301, workspace best known configuration table 302, and/or workspace bundle table 303.

In response to the administrator requesting the deployment of the workspace metadata and best known configuration (i.e., in response to the administrator requesting that the workspace associated with a device group be deployed to the devices in the device group), device management service 211 could send a notification to agent 203 on each device in the device group instructing agent 203 to deploy the workspace on the device. For example, device management service 211 could provide the workspace ID of the workspace to deploy to agent 203. Next, agent 203 can access workspace/best known configuration repository 230 to retrieve the workspace and best known configuration artifacts for the workspace to be deployed. For example, agent 203 could use the workspace ID to query workspace best known configuration table 302 to thereby obtain the workspace host version and configuration and the best known configuration associated with the workspace ID, and to identify and download the applications to be run in the workspace. Agent 203 could also use the workspace ID and/or the device group ID to query workspace metadata table 301 to determine the type of workspace and the resource allocation for the workspace. Agent 203 could then create the workspace on the device, apply the best known configuration to the workspace, and deploy each application in the workspace, again customized in accordance with the best known configuration. Accordingly, the workspace ID enables agent 203 on each device in the device group to obtain all information/content necessary to deploy the workspace on the corresponding device with the workspace being customized to the best known configuration for the device group.

In some embodiments, rather than having agent 203 build the workspace at the device, workspace management service 221 could create an image of the workspace which is customized in accordance with the best known configuration and make the image available to agent 203 for download and deployment. Also, in some embodiments, as opposed to using the data structures represented in FIGS. 3A-3C to statically define the workspace metadata and the best known configuration, workspace management service 211 could use machine learning techniques to dynamically generate the workspace metadata and the best known configuration for a particular device group (e.g., based on a device's or devices' maximum or currently available resources, an application's minimum or recommended resources, etc.).

In some embodiments, the same techniques could be employed to create workspace metadata and best known configurations for multiple workspaces that are to be employed on devices in a device group, including heterogenous workspaces. For example, a device group could be associated with a first workspace implemented as a hardware container and a second workspace implemented as a software container, and each of these workspaces could be deployed to the devices in the device group in accordance with the respective workspace metadata and best known configuration.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing best known configurations for workspaces, the method comprising:
   receiving, via a management console and from an administrator, user input that identifies a first device group consisting of end-user computing devices;
   receiving, via the management console and from the administrator, user input that defines a best known configuration for a first workspace to be deployed on the end-user computing devices in the first device group;
   in response to receiving the user input that defines the best known configuration for the first workspace, causing a workspace management service to store, in a repository, the best known configuration for the first workspace in association with the first device group;

receiving, by a device management service and via the management console and from the administrator, a request to deploy the best known configuration for the first workspace on the end-user computing devices in the first device group;

sending, by the device management service, a notification to an agent executing on each end-user computing device in the first device group, the notification instructing the agent to deploy the first workspace on the respective end-user computing device;

retrieving, by the agent executing on each end-user computing device in the first device group, the best known configuration for the first workspace from the repository; and deploying, by the agent executing on each end-user computing device in the first device group, the first workspace on the respective end-user computing device including applying the best known configuration to the first workspace, wherein the best known configuration for the first workspace includes peripherals to be made available in the first workspace such that applying the best known configuration to the first workspace comprises configuring the first workspace to make the peripherals available in the first workspace.

2. The method of claim 1, wherein the best known configuration for the first workspace is based on characteristics shared by the end-user computing devices in the first device group.

3. The method of claim 2, wherein the characteristics shared by the end user computing devices in the first device group include characteristics of one or more of RAM, a processor, or a storage drive.

4. The method of claim 1, wherein the best known configuration for the first workspace is based on a functional role in which the end-user computing devices in the first device group are used.

5. The method of claim 4, wherein the functional role comprises an organizational department.

6. The method of claim 1, wherein the best known configuration for the first workspace is stored in association with the first device group by associating a workspace ID of the first workspace with a device group ID of the first device group.

7. The method of claim 1, wherein the best known configuration for the first workspace includes information for how the peripherals are to be made available in the first workspace.

8. The method of claim 1, wherein the best known configuration for the first workspace includes settings for the peripherals to be made available in the first workspace.

9. The method of claim 6, wherein the best known configuration for the first workspace includes files to be included in the first workspace to support the peripherals to be made available in the first workspace.

10. The method of claim 1, further comprising:
defining workspace metadata for the first workspace, the workspace metadata including a workspace type.

11. The method of claim 10, wherein the workspace metadata identifies a hypervisor to be used to host the first workspace.

12. The method of claim 10, wherein the workspace metadata identifies an operating system to run within the first workspace.

13. The method of claim 1, further comprising:
identifying a second device group consisting of end-user computing devices;
defining a best known configuration for a second workspace to be deployed to the end-user computing devices in the second device group;
associating the best known configuration for the second workspace with the second device group; and
deploying the second workspace to the end-user computing devices in the second device group including applying the best known configuration to the second workspace.

14. The method of claim 13, wherein a type of the first workspace matches a type of the second workspace, but the best known configuration of the first workspace does not match the best known configuration for the second workspace.

15. One or more computer storage media storing computer executable instructions which when executed implement a method for managing best known configurations for workspaces, the method comprising:
receiving, via a management console and from an administrator, user input that identifies a first device group consisting of end-user computing devices;
receiving, via the management console and from the administrator, user input that defines a best known configuration for a first workspace to be deployed on the end-user computing devices in the first device group;
in response to receiving the user input that defines the best known configuration for the first workspace, causing a workspace management service to store, in a repository, the best known configuration for the first workspace in association with the first device group;
receiving, by a device management service and via the management console and from the administrator, a request to deploy the best known configuration for the first workspace on the end-user computing devices in the first device group;
sending, by the device management service, a notification to an agent executing on each end-user computing device in the first device group, the notification instructing the agent to deploy the first workspace on the respective end-user computing device;
retrieving, by the agent executing on each end-user computing device in the first device group, the best known configuration for the first workspace from the repository; and
deploying, by the agent executing on each end-user computing device in the first device group, the first workspace on the respective end-user computing device including applying the best known configuration to the first workspace, wherein the best known configuration for the first workspace includes peripherals to be made available in the first workspace such that applying the best known configuration to the first workspace comprises configuring the first workspace to make the peripherals available in the first workspace.

16. The computer storage media of claim 15, wherein first workspace includes a first set of applications.

17. The computer storage media of claim 15, wherein the best known configuration for the first workspace is based on a functional role in which the end-user computing devices in the first device group are used.

18. The computer storage media of claim 15, wherein the best known configuration for the first workspace is stored in association with the first device group by associating a workspace ID of the first workspace with a device group ID of the first device group.

19. A method for deploying a workspace to end-user computing devices in a device group, the method comprising:
    receiving, via a management console and from an administrator, user input that identifies a first device group consisting of end-user computing devices;
    receiving, via the management console and from the administrator, user input that defines a best known configuration for a first workspace to be deployed on the end-user computing devices in the first device group;
    in response to receiving the user input that defines the best known configuration for the first workspace, causing a workspace management service to store, in a repository, the best known configuration for the first workspace in association with the first device group, wherein the best known configuration for the first workspace is stored in association with the first device group by associating a workspace ID of the first workspace with a device group ID of the first device group;
    receiving, by a device management service and via the management console and from the administrator, a request to deploy the best known configuration for the first workspace on the end-user computing devices in the first device group;
    sending, by the device management service, a notification to an agent executing on each end-user computing device in the first device group, the notification instructing the agent to deploy the first workspace on the respective end-user computing device, the request specifying the workspace ID of the first workspace;
    retrieving, by the agent executing on each end-user computing device in the first device group and by using the workspace ID of the first workspace, the best known configuration for the first workspace from the repository; and
    deploying, by the agent executing on each end-user computing device in the first device group, the first workspace on the respective end-user computing device including applying the best known configuration to the first workspace, wherein the best known configuration for the first workspace includes peripherals to be made available in the first workspace such that applying the best known configuration to the first workspace comprises configuring the first workspace to make the peripherals available in the first workspace.

20. The method of claim 19, wherein the best known configuration defines how the peripherals are to be made available in the workspace.

* * * * *